UNITED STATES PATENT OFFICE.

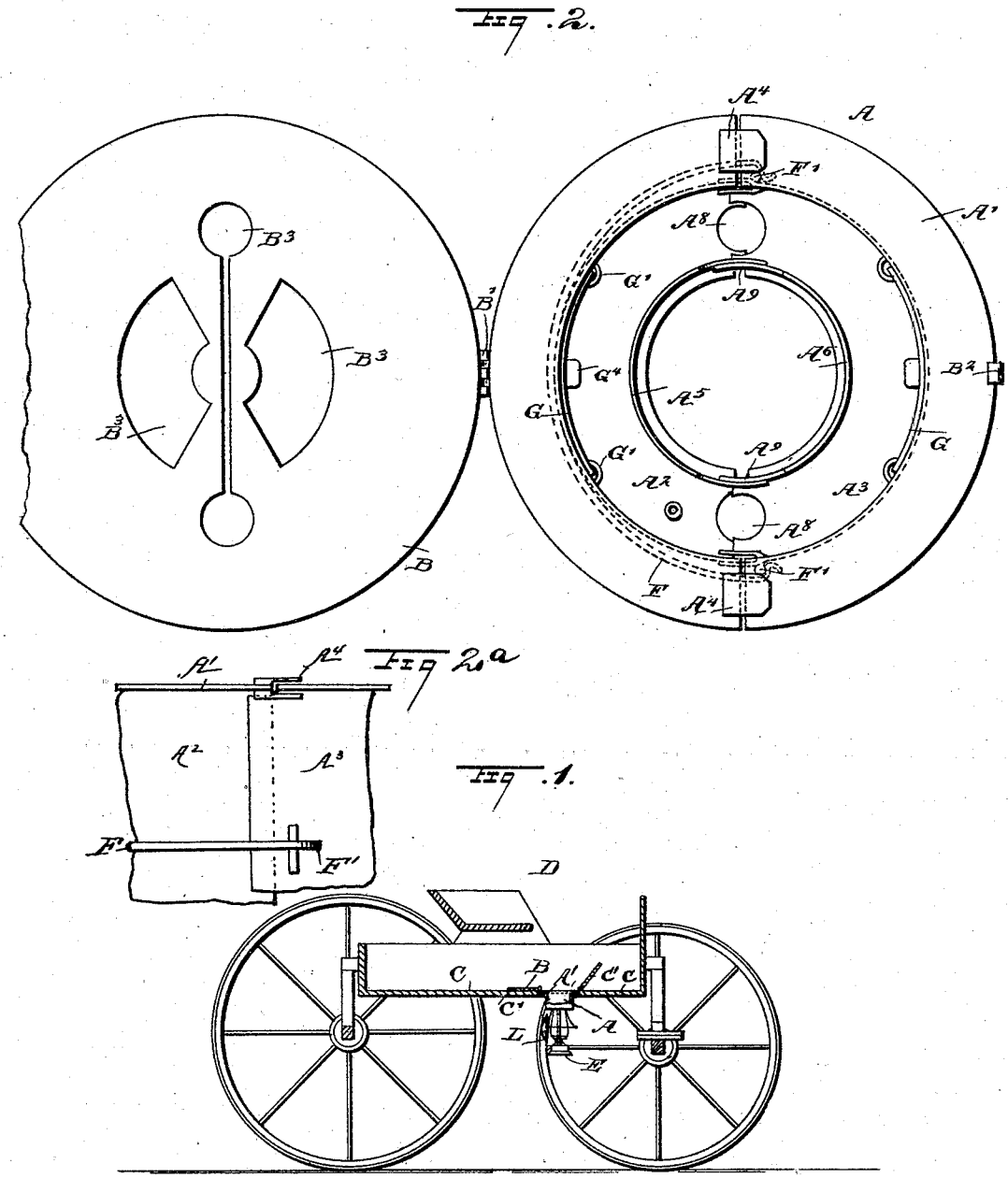

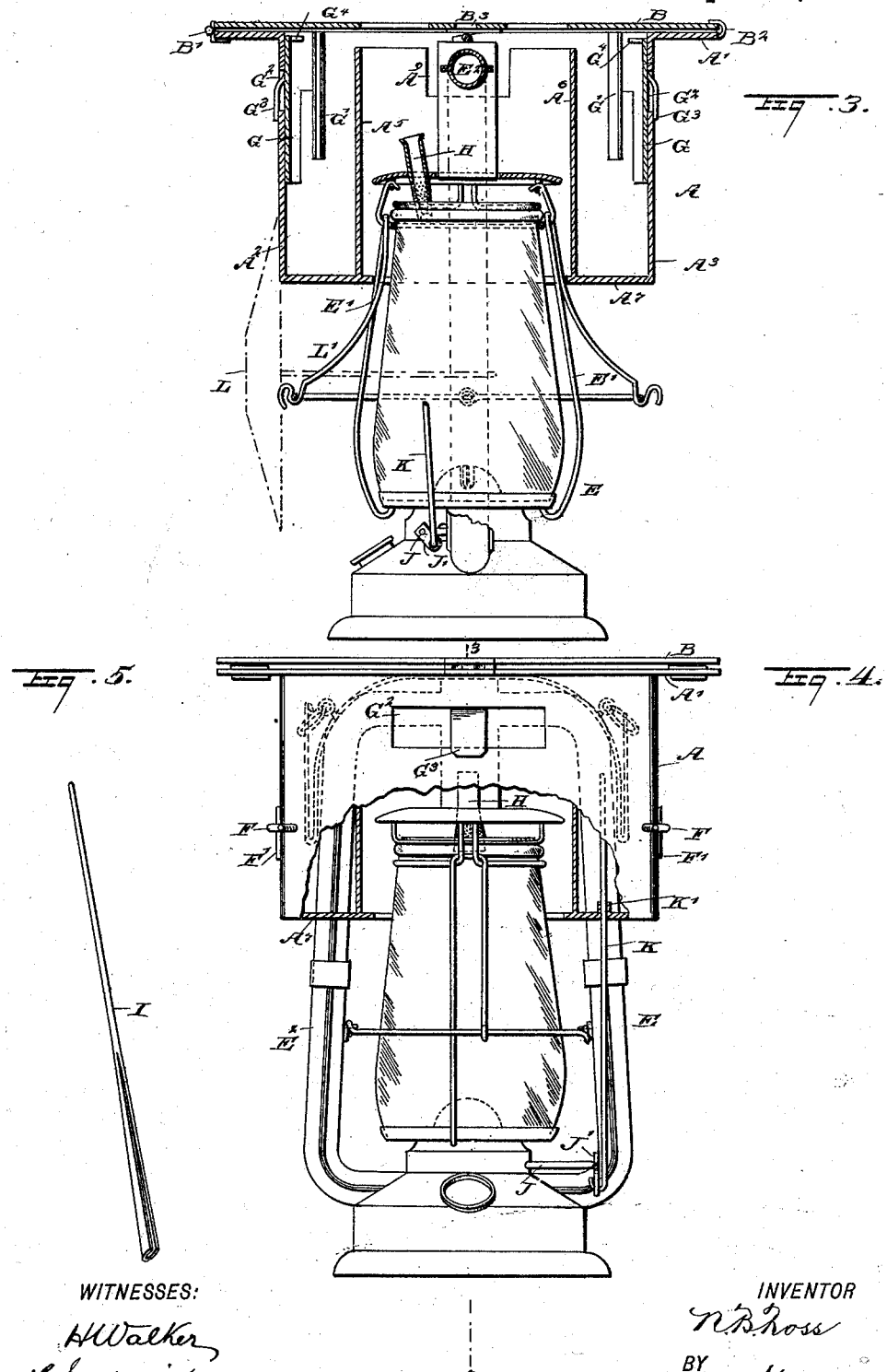

NAPOLEON B. ROSS, OF GILBOA, OHIO.

DEVICE FOR HEATING AND LIGHTING VEHICLES.

SPECIFICATION forming part of Letters Patent No. 505,330, dated September 19, 1893.

Application filed February 23, 1893. Serial No. 463,378. (No model.)

*To all whom it may concern:*

Be it known that I, NAPOLEON B. ROSS, of Gilboa, in the county of Putnam and State of Ohio, have invented a new and Improved Device for Heating and Lighting Vehicles, of which the following is a full, clear, and exact description.

The object of the invention is to provide a new and improved device for heating the interior of a vehicle, and simultaneously illuminating the road over which the vehicle passes.

The invention relates to the class of heating and lighting devices comprising a casing adapted to be secured to the bottom of a vehicle and also adapted to support a lamp, so that the light of the latter is shed exteriorly of the vehicle, while the heat of the lamp passes through the casing to the interior of the vehicle.

The invention consists of a special cover secured to the bottom of the vehicle and adapted to exclude heat therefrom whenever it is not desired to heat the vehicle.

The invention also consists of certain parts and details, and combinations of the same, as will be hereinafter described, and then pointed out in the claims.

Reference is to be had to the accompanying drawings, forming a part of this specification, in which similar letters of reference indicate corresponding parts in all the figures.

Figure 1 is a reduced side elevation of the improvement as applied, the vehicle being shown in section. Fig. 2 is a plan view of the casing. Fig. 2$^a$ is a front elevation of the central portion of the same. Fig. 3 is a cross section of the improvement on the line 3—3 of Fig. 4. Fig. 4 is a side elevation of the same with parts in section; and Fig. 5 is a perspective view of the match holder for lighting the lamp.

The improved device for heating and lighting vehicles, is provided with a casing A preferably made cylindrical in shape and having at its upper end a flange A' on which is hinged by a hinge B', a cover B adapted to close the upper end of the said casing A, the said cover being locked in place on the flange A' by a suitable catch B$^2$ arranged diametrically opposite the hinge B', as plainly shown in Fig. 2. The casing A is fitted into an aperture in the bottom C of the vehicle D, the flange A' and cover B resting on the upper surface of the bottom C, as plainly illustrated in Fig. 1. The casing A is arranged to support a lamp E of the usual railroad pattern, the said lamp extending a suitable distance below the lower end of the casing A, so that the light shed by the lamp illuminates the road and immediate parts of the vehicle, as will be readily understood by reference to Fig. 1.

A cover C' is attached, by suitable fastenings, to the bottom C of the vehicle, which completely closes the aperture and covers the top of the casing A, when it is turned down over the aperture. This cover may be turned down flat on the bottom of the vehicle when the aperture is opened, or it may stand on its edge and be hid from view by the drop curtain of the vehicle.

As shown in the drawings, the casing A is made in two parts A$^2$ and A$^3$, connected with each other by a spring rod F fastened at its middle to the section A$^2$ and engaging with its free hook ends, lugs or projections F' arranged on the exterior surface of the other section A$^3$, see Fig. 2. That part of the flange A' arranged on the section A$^2$ is provided with guide plates A$^4$ engaging that part of the flange A' secured on the section A$^3$, as will be readily understood by reference to Fig. 2, so that the two sections snugly fit one upon the other, to form the complete casing, the said sections being also adapted to be conveniently taken apart for various purposes.

Within the casing A is arranged a cylindrical offset formed of the two semi-circular parts A$^5$ and A$^6$ secured to the sections A$^2$ and A$^3$ respectively, at the bottom A$^7$ of the casing and inside of this cylindrical offset extends the upper part of the lamp E, the latter resting with its side bars E' on the inner edge of the bottom A$^7$, which is made ring-shape, as plainly shown in Fig. 3.

In the bottom A$^7$ of the casing A and at the joint of the two sections A$^2$ and A$^3$, are formed openings A$^8$ for the passage of the side tubes E$^2$ of the lamp E. The middle part of the said tubes extends through recesses A$^9$ formed in the upper end of the cylindrical offset composed of the parts A$^5$ and A$^6$, so that the said middle part of the tubes extends close to the under side of the cover B, as will be readily understood by reference to Fig. 3. The tubes E² pass up the outside of the cylindrical offset within the casing and then pass with their middle part through the recesses A⁹, so that the lamp is supported on the said central offset within the casing A.

The cover B is provided with any desired number of recesses or openings B³ (see Fig. 2), so that the heat emanating from the upper end of the lamp E ascends through the cylindrical offset in the casing A to finally pass through the openings B³ in the cover B to the interior of the vehicle, or the said heat may pass directly from the upper end of the casing A to the vehicle in case the cover B has been thrown back, as illustrated in Fig. 1.

If it is desired not to heat the vehicle, but only to use the lamp for illuminating the road over which the vehicle passes, then the cover which is attached to the bottom of the vehicle, is turned down over the aperture and the top of the casing A, and the heat is permitted to escape from the casing A through the walls thereof, and for this purpose, the walls of the casing A are provided with slides G mounted to slide vertically on the inside of the casing, the ends of the slides being engaged in suitable bearings G'. Each slide is adapted to open or close an opening G² in the wall of the casing A so that when the slide G is moved downward in its bearings G', the opening G² is uncovered, and the heat can pass from the interior of the casing to the outside below the bottom C of the vehicle D. Each of the slides G is provided with a spring tongue G³, which extends through the opening G² to engage with its free end, the outer surface of the casing A. Each of the slides G is also provided near its upper end with a handle G⁴ to enable the operator to conveniently move the slide G up or down to open or close the opening G², whenever the cover B is thrown back, as shown in Figs. 1 and 2.

In order to conveniently light the lamp E from the interior of the vehicle, I provide the upper end of the lamp E with a short tube H through which a match holder I may be introduced from above. The lower end of the tube H is made rough so that the match is struck as it passes through the tube.

The match holder I shown in detail in Fig. 5, is arranged to carry at its lower end, a match of ordinary construction, so that when the match is inserted in the holder it can be readily introduced through the tube H where it is struck, and passed down the chimney of the lamp, to light the latter.

In order to conveniently raise or lower the wick, I provide the wick shaft J with an arm J' pivotally-connected with a rod K extending upwardly through a bearing K' formed in the bottom A⁷ of the casing A. The upper end of the rod K extends within the casing A, so as to be within convenient reach of the operator, to pull or push the said rod to impart a swinging motion to the arm J' to turn the wick shaft J to raise or lower the wick, as the case may require.

In order to throw the light emanating from the lamp E forward in the direction in which the vehicle is traveling, I provide a reflector L, held on suitable arms L' adapted to be hooked onto the lamp at the rear thereof, as plainly shown in dotted lines in Fig. 3.

In order to apply the device on the vehicle all that is necessary is to bore an aperture in the bottom C of the vehicle for the passage of the cylindrical casing A, so that the flange A' thereof, rests on the top surface of the bottom, as plainly illustrated in Fig. 1. The operator now located in the vehicle D, can readily raise or lower the wick as required, and can also ignite the wick by a match inserted in the match holder I, and introduced through the tube H, as above described. It will be seen that by this arrangement, no difficulty will be experienced in stormy weather in lighting the lamp from within the vehicle, as the match is fully protected both in the vehicle and in the casing A and lamp E. The casing A is preferably made in sections as described so that the casing can be opened to remove the lamp for cleaning or for other purposes.

By reference to Fig. 3, it will be seen that sufficient space exists between the chimney of the lamp and the cylindrical offset in the casing A to permit the air to pass up the chimney, to be heated thereby and pass in this heated condition through the casing into the vehicle to heat the same.

Having thus fully described my invention, I claim as new and desire to secure by Letters Patent—

1. A device for heating and lighting vehicles, comprising a casing adapted to be passed through an opening in the bottom of the vehicle, a flange formed on the upper end of the said casing and adapted to be seated on the bottom of the vehicle to support the casing in place in the vehicle, a lamp supported in the said casing and projecting a suitable distance below the same, so that the light of the lamp is shed exteriorly of the vehicle, while the heat of the lamp passes through the said casing to the interior of the vehicle, an apertured cover hinged to the said flange to close the upper end of the casing within the vehicle, and a solid cover attached to the bottom of the vehicle for excluding the heat therefrom and for covering up the aperture, substantially as shown and described.

2. A device for heating and lighting vehicles, comprising a casing adapted to be fitted into an aperture in the bottom of the vehicle, a flange arranged on the upper end of the said casing and adapted to be seated on the bottom of the vehicle, a lamp supported in the said casing and projecting with its lower part a suitable distance below the bottom of the said casing, and slides arranged in the upper portion of the wall of the said casing above the top of the lamp's chimney to open and close openings therein, substantially as shown and described.

3. A device for heating and lighting vehicles, comprising a casing made in sections and adapted to be fitted into an opening in the bottom of the vehicle, a flange secured on the upper end of the said casing and adapted to be seated on the upper surface of the bottom of the vehicle, a spring rod having hook ends and secured to one section of the said casing, to engage lugs on the other section of the said casing to lock the two sections in place, and a lamp secured with its upper end in the said casing, substantially as shown and described.

4. A device for heating and lighting vehicles, comprising a casing made in sections and adapted to be fitted into an opening in the bottom of the vehicle, a flange secured on the upper end of the said casing and adapted to be seated on the upper surface of the bottom of the vehicle, a spring rod having hook ends and secured to one section of the said casing to engage lugs on the other section of the said casing to lock the two sections in place, and a cylindrical projection secured to the ring-shaped bottom of the said casing to form a support for the upper end of the lamp, substantially as shown and described.

NAPOLEON B. ROSS.

Witnesses:
M. E. SMITH,
W. G. ROSS.